UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

CRYSTALLINE FUSED ALUMINA AND THE MANUFACTURE THEREOF.

1,192,709. Specification of Letters Patent. Patented July 25, 1916.

No Drawing. Application filed December 1, 1914. Serial No. 875,009.

*To all whom it may concern:*

Be it known that I, FRANK J. TONE, a citizen of the United States, residing at Niagara Falls, in the county of Niagara and State of New York, have invented a new and useful Improvement in Crystalline Fused Alumina and the Manufacture Thereof, of which the following is a full, clear, and exact description.

The object of this invention is the production of a new form of crystalline fused alumina for use as an abrasive material and possessing new and valuable characteristics.

Crystalline fused alumina is commonly produced by the fusion in the electric furnace of various aluminous materials or ores, such as alumina, bauxite, emery or clay, reducing at the same time a portion of the impurities or foreign material, when such are present in such ores, with the addition to the charge of a small percentage of carbon, the impurities consisting mainly of iron oxid, silica and titanium oxid. The well known method of working consists in fusing a charge of the aluminous ore in a crucible-shaped furnace heated from depending electrodes. The hearth or bottom of the furnace consists of a refractory base generally of carbon and the sides consist of a steel shell over the outer surface of which cooling water is caused to flow. This not only keeps the shell from being melted by the heat of the furnace, but maintains a layer of the unfused charge next to the shell. Some cooling effect may also be produced on the fused alumina, but in view of the relatively greater amount of heat being liberated in the zone of fusion, this cooling effect is not of importance on the mass of the ingot. New charge is added from time to time, as the charge under treatment becomes fused, thus building up in the furnace a large ingot of crystalline fused alumina. When the ingot reaches a sufficient size, generally from two to five tons, the power is shut off and the furnace allowed to cool. The shell of the furnace is removed after the ingot solidifies and it is then broken down and crushed to the various sizes of grains required for grinding wheels and various abrasive purposes. This product, which is cooled in the furnace, I will hereafter refer to as "regular product."

Crystalline fused alumina made in accordance with my improved method employs the same type of furnace and the same charge of raw materials. Instead, however, of building up a large ingot, the molten material after being brought to a high state of fluidity, is tapped out in small masses and quickly frozen. This freezing results in arresting the progress of crystallization and in the production of a crystalline structure of extreme fineness. Fused alumina is a material possessing extremely high crystallizing power. The crystal growth takes place with great rapidity and in order to arrest this growth and to produce alumina having the desired characteristics, I have found it necessary to adopt means for rapidly removing the highly fused alumina from the furnace and freezing it in the shortest possible time. A tapping hole is provided in the side of the furnace level with the hearth. The product in the furnace is not only used, but is brought to a temperature several hundred degrees above its melting point and at which it is of high fluidity. The tapping hole is then opened and the molten material allowed to flow out quickly into a mold. This mold is shallow and preferably large enough so that the thickness of the tapped material will not exceed eight inches, and preferably not over six inches. It may be made of iron or steel and lined with carbon, or it may be made entirely of steel, thus giving a high freezing effect. The fused material solidifies almost instantly and after further cooling is removed from the mold, crushed and treated in the usual manner for the manufacture of abrasive grains.

The regular product of crystalline fused alumina generally consists of from ninety to ninety-eight per cent. alumina, the remainder, which may be designated as impurities, being principally compounds of iron, silicon, titanium and lime. Microscopic examination shows that this regular product consists of alumina crystals and a residual basis or material made up principally of the impurities above mentioned contained in the ore. In general, the grains are anhedral to subhedral crystals and are roughly equidimensional, and there is a tendency toward a tabular habit. The size of the crystals though somewhat variable is, on the whole, uniform and will average from .3 to 1. millimeter, the general average being .5 millimeter.

The residual basis is the foreign material separating to a considerable extent the $Al_2O_3$ crystals or found as inclusions therein. There is without exception some foreign material in the $Al_2O_3$ crystals. Its amount varies in different samples. It takes the form of fine black dust-like particles commonly aggregated into small patches. Its character affects the cohesive properties of the grains. The residual basis is usually amorphous though sometimes crystalline. It is opaque and partly black. It is not definitely determinable in character, but appears to consist mainly of compounds of titanium, iron and silica, though sometimes with a glass containing silica. As it has a different coefficient of expansion from $Al_2O_3$ its presence results in internal tension which, in turn, causes a weakness or brittleness in the crystals. The residual basis between the grains is thin, rarely measuring more than a few thousandths of a millimeter, but often broadens out in the larger interstices between the crystals and penetrates them along crystallographical directions.

In addition to a glass associated with the black material and really forming part of the residual basis, there is a variable amount of crystallized material in the form of small crystals having a strongly plate-like structure due to a well developed cleavage. This lies parallel to the boundaries or in the large interstices sometimes penetrating into the $Al_2O_3$ crystals. These crystals are usually very small, about a few thousandths to hundredths of a millimeter long and possess commonly a strong dichroism, sapphire blue to smoky gray. The material appears to be unaxial and negative in optical character, and is believed to be also crystallized alumina. If this is $Al_2O_3$ its color is doubtless due to dissolved impurities, which also seem to affect its mean index of refraction, rendering it a little different than that of the alumina crystals of the first generation. Their cleavage causes a greater ease of breaking and they, together with the residual basis, afford lines or surfaces of weakness which are important in determining the breaking down of the mass as a whole. The size of the fragment which will stand up as an actual unit is thus seen to be in part a function of the size of the individual alumina crystals of the first generation, since they are separated from each other in a large part by a more or less continual film of weaker cohesive power which furnishes a surface of fracture.

The finely crystallized product of fused crystalline alumina made by the present process from the same raw materials and of the same chemical composition as the regular product, examined with the eye alone, appears to be exceedingly dense and almost devoid of physical structure. The fracture is very tough and irregular. Under the microscope, either in thin sections or in crushed material, it is seen to consist in large part of an exceedingly fine grained, perfectly compacted and sealed aggregate of roughly equidimensional crystalline grains of $Al_2O_3$ mingled, as hereinafter described, with minute particles of black, opaque substance consisting mainly of compounds of titanium, iron and silicon. The great majority of the $Al_2O_3$ grains are anhedral crystals. Many are rounded or irregular in outline and others are angular to sub-angular, while interspersed among others are crystals, flattened or plate-like in shape, showing parallel lines of incipient parting or cleavage, and less commonly, having an almost fibrous appearance. Occasional grains may show some trace of bounding planes and may be termed subhedral crystals.

In size, the crystals of $Al_2O_3$ will in general vary from those under .01 millimeter in diameter to, in exceptional cases, those measuring .3 millimeter in average dimension. The general average appears to be a little over .1 millimeter. An actual measurement of several thousand grains gave an average dimension of .116 millimeter. In the regular product of fused crystalline alumina, the grain while somewhat variable, will run on the average from three to six times as coarse, that is, of a different order of magnitude, using this term in its accepted petrographical significance.

In occasional samples, narrow streaks or bands of grains are found that will average somewhat finer than the rest and again there are bands and irregular patches where the crystals are largely of the short tabular form mingled with rounded and irregular grains, also bands or patches where small tabular and composite crystals occur. These bands and patches, although sometimes well defined as to outline, merge rapidly into the surrounding material. In this fine grained material are the usual minute opaque black particles noted in the regular product. This material forms minute specks, dusty patches, larger irregular shaped patches, rounded globules and branching crystallizations. It is in general more evenly distributed throughout the mass as a whole than in the regular product of substantially the same composition, and therefore, appears to be more abundant. No exact definition as to the degree of evenness or uniformity of distribution of the residual material can, in the nature of things, be given. As compared in this respect with the regular product, however, the greater degree of uniformity in the former is so marked as to be readily seen under the microscope, and such examination alone will clearly distinguish the new product from the regular product. This distribution as compared with the distribution in the regular product, in which it is highly irregular and non-uniform, may be said to be substantially uniform, and this is the sense in which the term "substantially uniform" is to be understood herein and in the appended claims. There is the same tendency for it to accumulate about the margins of the grains, though in view of its more even distribution, it is here less important as an intervening foreign substance cementing the crystals of $Al_2O_3$.

The special features which characterize the finely crystallized product from the regular product of substantially the same chemical composition are: (1) the finer average grain; (2) the more general distribution of the opaque material through the mass, and the relatively smaller size of the tabular (rarely blue) type of $Al_2O_3$ crystal showing parting or cleavage lines.

The great fineness of the grain together with the irregular but tightly sealed contours of the individual crystals, as well as their vicarious orientations, make the fragments, such as would be used for coarse numbers of abrasives or in making grinding wheels, more resistant to breaking forces, other things being equal, than the material made up of larger and consequently fewer crystals. In fragments of the new product, there are a great number of minute crystals standing at all angles to one another, and since each crystal possesses its own particular direction of variable resistance to strain, it follows that such an aggregate, other things being equal, presents a greater resistance to breaking than an aggregate of larger crystals. Breaking strains impressed on one or more single small crystals extend beyond these grains into the fragment with less ease than they would in a fragment made up of few large crystals (or perhaps even of one large crystal) for in the latter case, the strains would be transmitted for a greater distance through crystallographically continuous material.

Owing to the relatively more general distribution of opaque foreign material, as compared with the regular product, the seal of grain to grain is effected to a proportionally larger extent by the substance of the $Al_2O_3$ crystals themselves, resulting in a firmer union. The foreign material possesses a different coefficient of contraction from the $Al_2O_3$ which alone is a source of weakness, particularly where the former acts as a cementing substance. With the more general distribution of the opaque particles, any strains or weakness caused by their presence is more evenly distributed through the mass, as a whole, and diminishes the tendency to localized breaking.

By the terms "rapid" and "rapidly" as applied to the freezing operation herein, I refer to a freezing outside of the furnace, and under conditions in which the growth of crystals is completely checked within a small fraction of the time required to stop crystalline growth when the cooling occurs within the furnace.

I claim:

1. As a new article of manufacture, crystalline fused alumina, in which the major portion of the alumina crystals have an average diameter of about one tenth millimeter.

2. As a new article of manufacture, crystalline fused alumina, in which the major portion of the alumina crystals have a diameter of less than .15 millimeter.

3. As a new article of manufacture, crystalline fused alumina, in which the major portion of the alumina crystals range in size from .01 to .3 millimeter.

4. As a new article of manufacture, crystalline fused alumina, in which the major portion of the alumina crystals are of an average lower order of magnitude than .3 millimeter.

5. As a new article of manufacture, crystalline fused alumina comprising alumina crystals and residual basis and in which the residual basis is substantially uniformly distributed.

6. As a new article of manufacture, crystalline fused alumina, comprising alumina crystals and residual basis, and in which the major portion of the crystals have an average diameter of about .1 millimeter.

7. As a new article of manufacture, crystalline fused alumina, comprising alumina crystals and residual basis, and in which the major portion of the alumina crystals have a diameter of less than .15 millimeter.

8. As a new article of manufacture, crystalline fused alumina, comprising alumina crystals and residual basis, and in which the major portion of the alumina crystals range in size from .01 to .3 millimeter.

9. As a new article of manufacture, crystalline fused alumina, comprising alumina crystals and residual basis, and in which the major portion of the alumina crystals are of an average lower order of magnitude than .3 millimeter.

10. As a new article of manufacture, crystalline fused alumina composed of alumina crystals and residual basis, the major portion of the crystals being of a diameter of less than .15 millimeter and having vicarious orientations.

11. As a new article of manufacture, crystalline fused alumina composed of alumina crystals and residual basis, the major portion of the crystals having a diameter of less than .15 millimeter, and the residual basis being substantially evenly distributed.

12. As a new article of manufacture, crystalline fused alumina composed of alumina crystals and residual basis, the major portion of the crystals having a diameter of less than .15 millimeter and in which the seal of grain to grain is effected by the substance of the $Al_2O_3$ crystals.

13. As a new article of manufacture, crystalline fused alumina composed of alumina crystals and residual basis, the crystals being of an average order of magnitude less than .3 millimeter, and the residual basis being substantially evenly distributed therein.

14. The method of making crystalline fused alumina, which consists in fusing a charge of aluminous ore, heating it to a temperature sufficiently above its melting point to bring it to a state of high fluidity, removing it from the furnace, and then rapidly freezing it.

15. The method of making crystalline fused alumina, which consists in fusing a charge of aluminous ore and carbon and heating it to a temperature sufficiently above its melting point to bring it to a state of high fluidity, and tapping it out of the furnace and then rapidly freezing it.

16. The method of making crystalline fused alumina, which consists in fusing a charge of aluminous ore in an electric furnace, heating it to a temperature sufficiently above its melting point to bring it to a state of high fluidity, and then causing it to freeze with sufficient rapidity to produce $Al_2O_3$ crystals, the major portion of which have an average diameter of less than .15 millimeter.

17. The method of making crystalline fused alumina, which consists in fusing a charge of aluminous ore in an electric furnace, heating it to a temperature sufficiently above its melting point to bring it to a state of high fluidity, tapping it out of the furnace in a shallow mass, and then causing it to rapidly freeze.

18. The method of making abrasive material which consists in fusing in an electric furnace the substance or substances from which the abrasive material is to be formed, and cooling the fused substance in a body of small ratio of mass to superficial area.

19. The method of making abrasive material which consists in fusing aluminous material and cooling the fused material in a body of small ratio of mass to superficial area.

20. The method of making abrasive material which consists in fusing the substance or substances from which the abrasive material is to be formed and in cooling the fused substance by exposing it in a thin layer to a cooling medium.

21. The method of making abrasive material which consists in fusing aluminous material and in cooling the fused material by exposing it in a thin layer to a cooling medium.

22. The method of making abrasive material which consists in fusing in an electric furnace the substance or substances from which the abrasive material is to be formed, and cooling the entire body of the fused substance in a body of small ratio of mass to superficial area.

23. The method of making abrasive material which consists in fusing aluminous material and cooling the entire body of the fused material in a body of small ratio of mass to superficial area.

In testimony whereof, I have hereunto set my hand.

FRANK J. TONE.

Witnesses:
 FRED I. PIERCE,
 C. S. DOUGLAS.